Sept. 1, 1970          C. A. RODGERS          3,526,289

LOAD ADJUSTING VEHICLE FOR TOWED TRAILERS

Filed Jan. 5, 1968          4 Sheets-Sheet 3

INVENTOR.
CLARK A. RODGERS

ATTORNEY

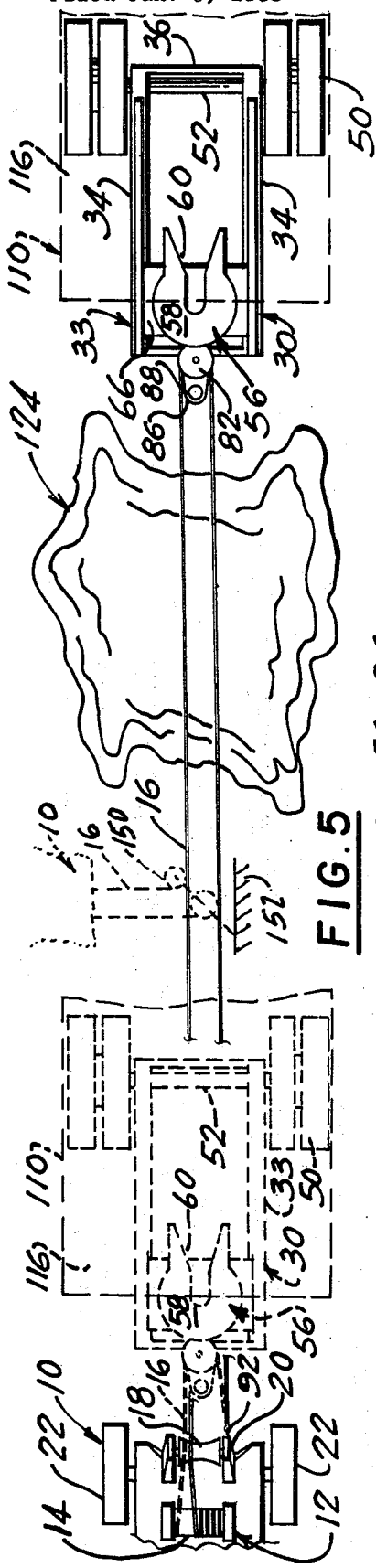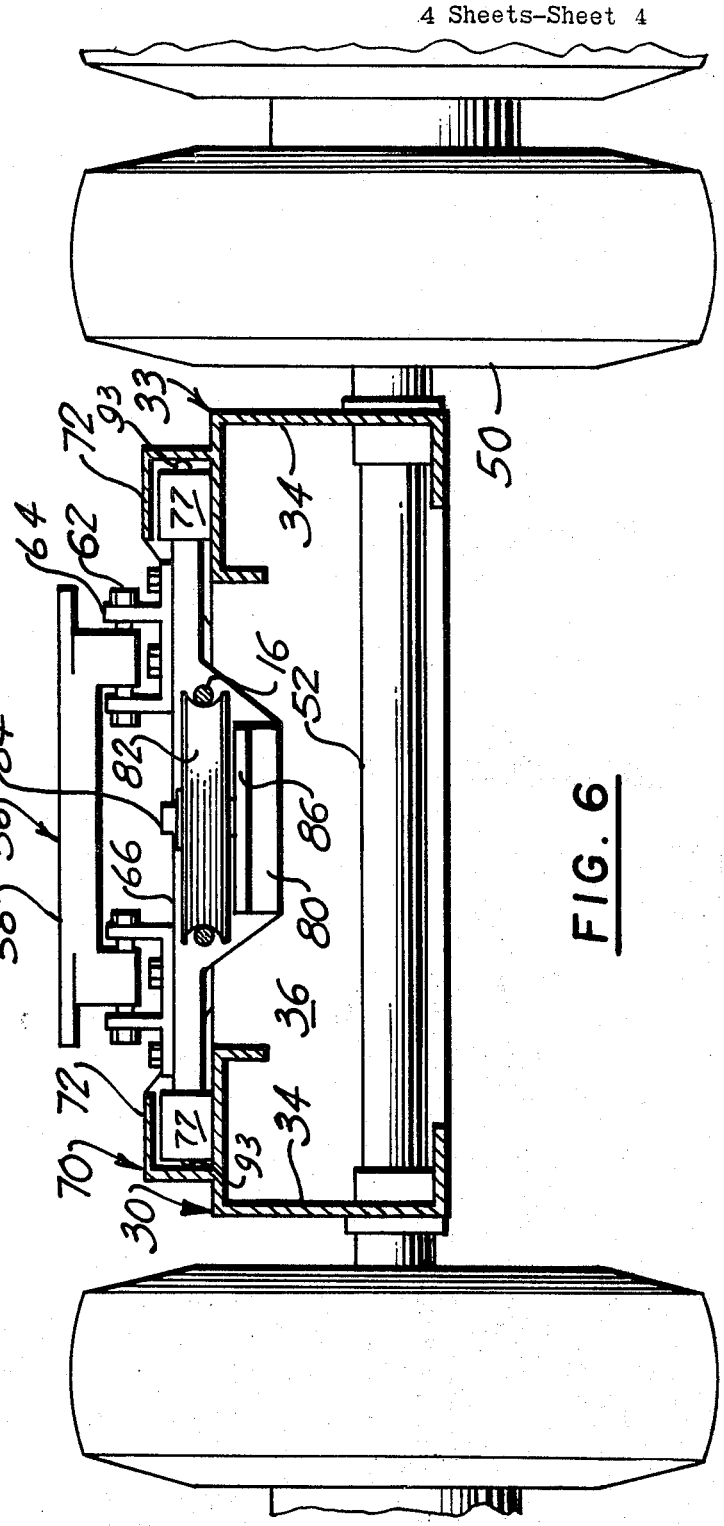

United States Patent Office 3,526,289
Patented Sept. 1, 1970

3,526,289
LOAD ADJUSTING VEHICLE FOR TOWED TRAILERS
Clark A. Rodgers, 2624 Garden Lakes Blvd., Rome, Ga. 30161
Filed Jan. 5, 1968, Ser. No. 696,025
Int. Cl. B62d 57/00, 53/00
U.S. Cl. 180—7                                                    10 Claims

ABSTRACT OF THE DISCLOSURE

A shorter vehicle having an caster wheel on the front and dual wheels mounted on an axle on the rear of a shorter frame than the usual towed trailer. A conventional tractor-trailer fifth wheel is movably mounted on the frame to be winched by a pulley cable arrangement between the towing vehicle and the fifth wheel on the present vehicle to slide the fifth wheel on which there may be positioned the front end of a heavily loaded logging trailer or the like so as to be able to power winch the heavily loaded trailer across a difficult terrain area anytime the towing vehicle is unable to move the loaded trailer. The present device may be used in logging areas and operations to bring a heavily loaded trailer of logs out of the difficult terrain and onto a better road at which time the present load adjusting vehicle may be removed and the usual tractor-trailer combination continued for transporting the trailer.

BACKGROUND OF THE INVENTION

Field of the invention

Land vehicles, especially those arranged in the relationship of a towed vehicle to a towing vehicle with power means (e.g. winch) thereon.

GENERAL COMMENTS ON ANY PRIOR ART

Prior art devices include many types of trailer adjustment devices which comprise those devices having an adjustable fifth wheel on the towing vehicle or tractor which allows the trailer to be shifted substantially longitudinally with respect to the rear wheels of the towing vehicle in order to balance or adjust the load of the trailer with respect to the weight on the rear wheels of the towing tractor. Such devices are physically incapable of moving a heavily loaded trailer if, for example, the rear wheels of the trailer were stuck in mud, anchored against rock ledge, or blocked by difficult terrain. There is no provision for supporting the front end of the trailer on wheels which may be divorced from the towing vehicle thereby providing this versatility sometimes needed in difficult terrain. Without the separateness of the load adjustment vehicle separate from both the towing vehicle and the trailer vehicle, when desired, there are limitations on the distance the trailer may be moved as well as the weight. The present invention provides a separate load adjusting vehicle to be interposed between the towing vehicle and a heavily loaded trailer and with a strong power means and the necessary stability to pull a trailer out of or to position the trailer under difficult conditions.

DESCRIPTION OF THE DRAWINGS

Other and further objects and advantages of this invention will become apparent upon reading the following specification in conjunction with the accompanying drawings, in which:

FIG. 5 is a top plan view of the present vehicle shown attached in dotted lines to a skidder-type vehicle and illustrating in full straight directional lines the power pulling across difficult terrain.

FIG. 6 is a cross-sectional view taken substantially along lines 6—6 in FIG. 3.

DESCRIPTION OF A PREFERRED EMBODIMENT

Figure 1:
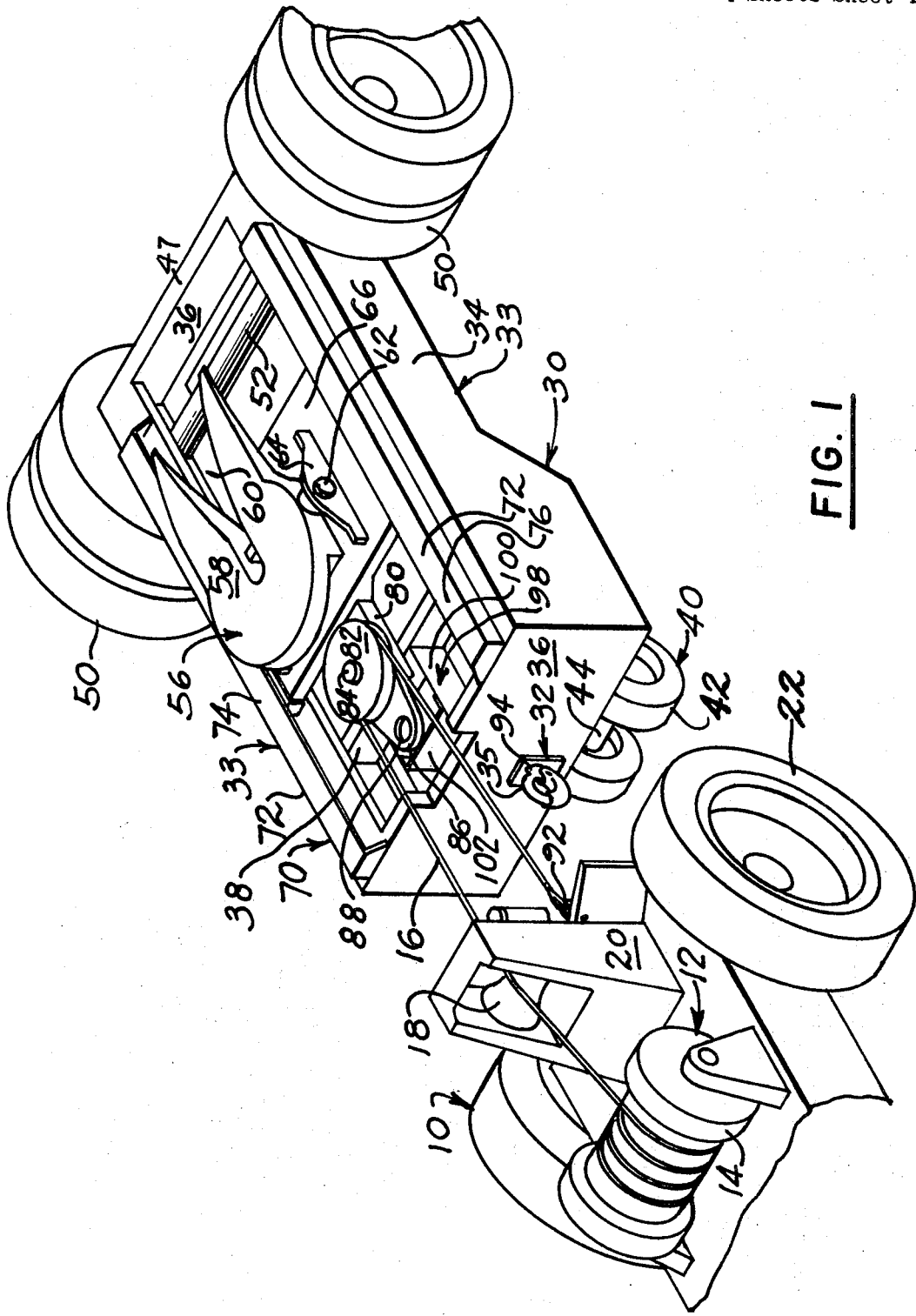
FIG. 1 is a perspective view looking toward the front end of a vehicle made in accordance with the present invention illustrated in connection with a conventional skidder-type towing vehicle having parts thereof broken away.
Figure 2:
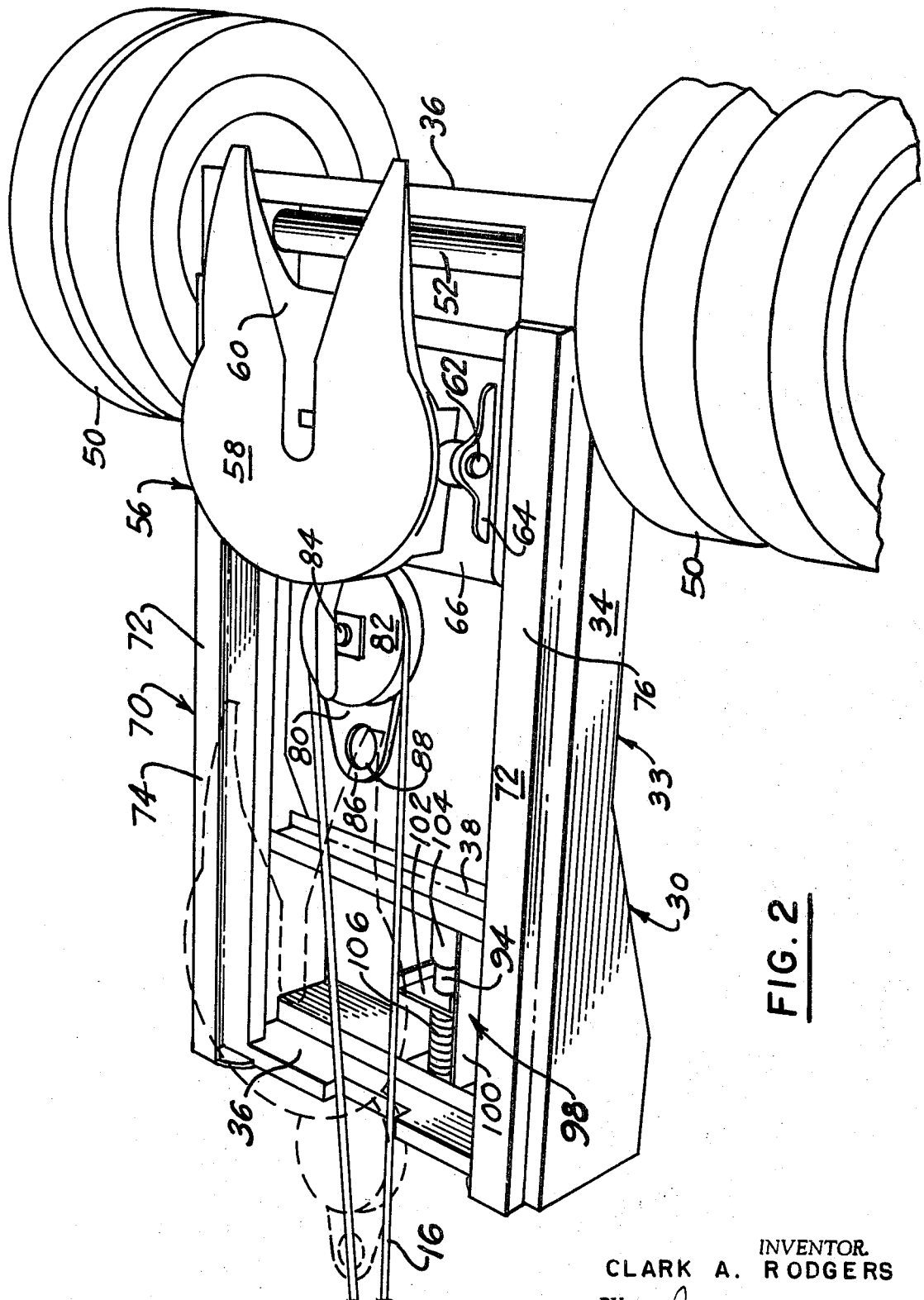
FIG. 2 is a perspective view of the vehicle shown in FIG. 1 looking down on the frame and the movable fifth wheel arrangement.

Referring initially to FIG. 1, a typical towing vehicle identified generally by reference numeral 10 therein does not per se form any part of the present invention since other towing vehicles may also be used. The particular towing vehicle 10 illustrated is generally known in the logging industry and heavy equipment industry as a skidder-type vehicle which may be a four-wheel drive of the sort sold under one name "Paylogger" by International Harvester Export Company or The John Deere Co. JD-440 Series A, Skidder, Moline, Ill. This vehicle could as well be a crawler-type or track-type vehicle having crawler treads like a tank, one of which is sold under the name "Wood Tiger" and distributed by Southeastern Equipment Company, Inc., Augusta, Ga. The towing vehicle 10 should have a power winch arrangement designated by reference numeral 12 and located near the rear end of the vehicle and which includes a drum 14 about which is wound a heavy cable 16 passing through a fairlead 18 mounted on a frame structure 20 on the rear of the towing vehicle 10 which is supported on heavy rear wheels 22. The towing vehicle 10 also includes a towing hook 24 to which the load adjusting vehicle of the present invention which is designated generally by reference numeral 30 may be attached through a coupling member designated generally by reference numeral 32 and which includes a spring hook 32 which may be opened and hooked into the member 24 on the towing vehicle 10.

The instant vehicle 30 comprises a heavy chassis or longitudinal, box-like frame designated generally by reference numeral 33 and comprising longitudinal steel beams 34 and transverse steel beams 36 as well as intermediate beams 38 welded together to form a rigid and extremely strong vehicle frame capable of withstanding tremendous forces. The front end underside of the frame 33 is provided with a dual caster wheel arrangement 40 comprising a single caster wheel or a pair of rubber tired caster wheels 42 mounted on an axle 44 carried on a pivot arrangement 46 bolted or otherwise secured to the underside frame 33. The rear of the frame 47 is normally ground supported by means of opposed pairs of dual wheels 50 mounted on a heavy duty axle 52 extending through the side frame members 34 and being mounted for rotation thereon.

A movable fifth wheel arrangement is designated generally by reference numeral 56 and is slidably mounted longitudinally substantially parallel with the length of the frame members 34. Fifth wheel arrangement 56 includes a conventional trailer fifth wheel plate 58 with the usual tapered notch 60 leading thereto and the plate 58 is tiltably mounted on a transverse axle 62 supported on opposed journals 64 mounted on a large heavy support plate 66 which is slidably carried in a slide frame designated generally by reference numeral 70 and comprising spaced, opposed track members 72 on opposite sides of the load adjusting vehicle 30 and each made from spaced metal plates 74, 76 in which are confined for movement the ends 77 of plate 66. Grease is normally coated on the track 70 in the areas on which the large heavy plate slides as well as on the top of the fifth wheel plate 58. Rigidly attached to the front end of plate 66 is a smaller, heavy pulley plate 80 on which is mounted a cable pulley 82 rotatable on a large pulley pin 84 mounted on plate 80. A large flange 86 is attached to and protrudes from the front of the pulley plate 80 and has a hole 88 therein. As seen in FIG. 1, cable 16 extends from the winch drum 14 across the fairlead 18 around the cable pulley 82 and back to and secured to the rear end of the towing vehicle 10 to a hook 92 thereat. Ends 77 of plate 66 are provided at spaced locations with rollers 93 to prevent binding.

The hook arrangement 32 may be in a form sometimes called a pintle hook. The hook 34 is attached to a' long shaft 94 which extends through the front frame member 36 and is anchored inside a frame designated generally by reference numeral 98 and comprising longitudinal frame member 100 and transverse frame members 102 through which shaft 94 passes and is anchored to a transverse frame member 38 by means of a connector 104. A large heavy coil spring 106 is interposed around shaft 94 between frame member 102 and front frame member 36 providing a resilient mounting for the shaft 94 and the hook assembly 32 so that sudden or uneven forces are absorbed by the spring 106 which may prevent breaking of the hook assembly 32 or dislodgement of hook assembly 32 from the vehicle 30.

Figure 3:
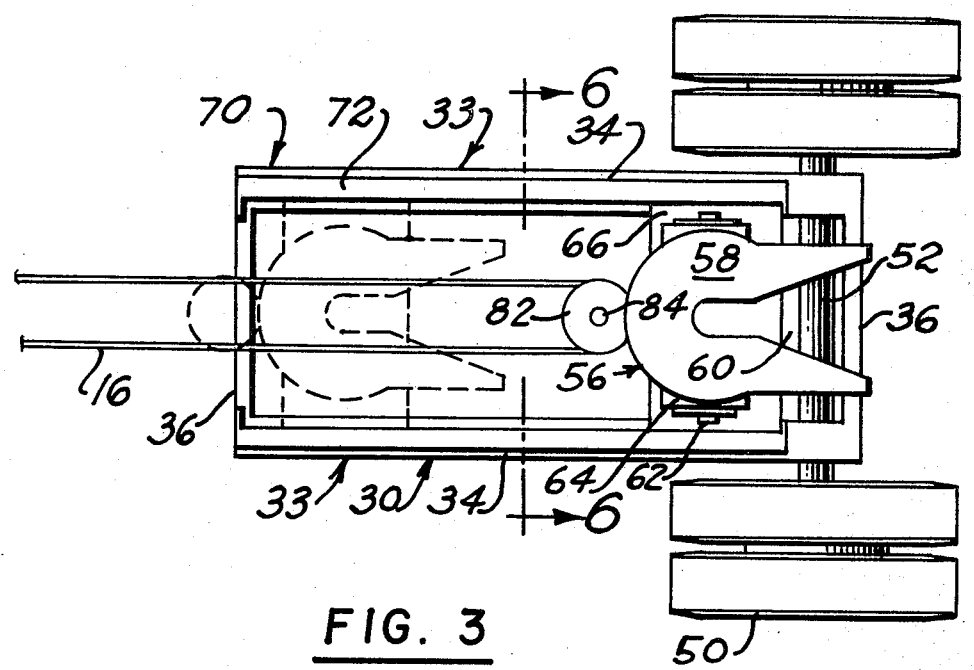
FIG. 3 is a top plan view of the present vehicle shown in FIGS. 1 and 2 illustrating in dotted lines the power movement of the fifth wheel.
Figure 4:
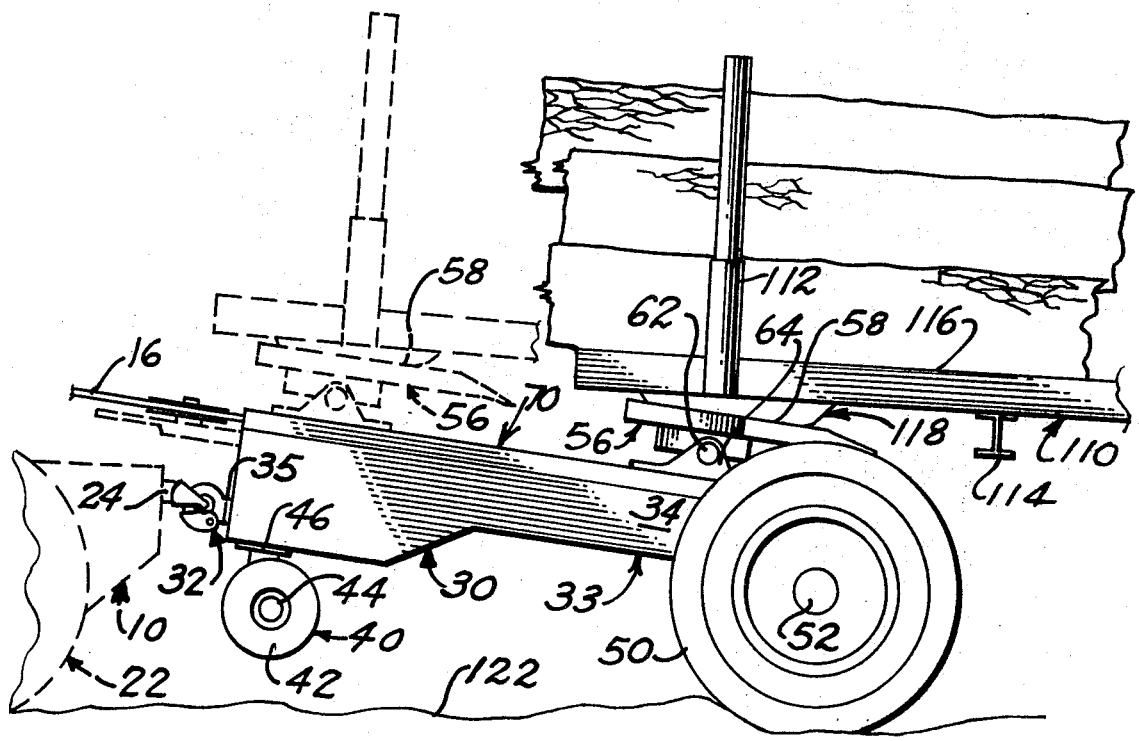
FIG. 4 is a side elevation view of the vehicle shown in FIGS. 1 and 2 attached to a skidder-type vehicle shown in FIG. 1 and to a typical logging trailer and illustrating in dotted lines the power movement of the fifth wheel on the trailer.

The normal driving position of the fifth wheel 56 is approximately as shown in FIG. 1 which is about half way from the front end of the vehicle that carries the hook assembly 32 to the rear end of the vehicle where the rear tires 50 are located. The forward position shown in the dotted lines in FIG. 4 is approximately the position of greatest weight resting on the pulling or towing vehicle 10. The rearward position represented by the full line of the fifth wheel assembly 56 in FIGS. 3 and 4 is approximately the rearwardmost position of the fifth wheel assembly 56 and approximately the least weight on the towing vehicle 10.

In FIG. 4 the load adjusting vehicle 30 is shown with the towing vehicle 10 attached by the towing hook 24 hooked into the pintle hook assembly 32 on the load adjusting vehicle 30 and the fifth wheel assembly 56 is carrying the front end of a heavily loaded trailer 110 which may be a heavy-duty logging trailer such as a pulpwood rigid standard frame with heavy duty tandem axles capable of carrying up to twelve cords of wood for the pulpwood industry. A load such as this while manageable on a hard road is extremely difficult to handle in rough terrain which may include a sloppy or muddy area as well as hills, ditches, precipice, and holes. One normal practice is to use a skidder-type vehicle or a crawler-type vehicle for maneuvering over such rugged terrain and a heavy duty winching system including a winch 12 and a heavy duty cable 16. For the purpose of illustration, the heavily loaded trailer 110 which has bolsters 112 and a chassis 114 on which there is a bed 116 and a matching fifth wheel pivot arrangement 118 seated in place on the fifth wheel assembly 56 on the load adjusting vehicle 30. The full line positions of FIGS. 3 and 4 could represent the initial starting condition in removing the trailer 110 from one location over rugged terrain represented by the lines 122 until the trailer 110 is transported to a hard road where it may be attached to a conventional over the road tractor. Assuming in FIGS. 3 and 4 that trailer 110 as shown in phantom is resting with its rear wheels in a ditch or in a rugged ground area and that the towing vehicle 10 is unable to start it under way without considerable difficulty, the cable 16 can be slacked allowing the towing vehicle and the load adjusting vehicle 30 to move forward underneath the front end fifth wheel pivot assembly 118 corresponding to the solid line position of the trailer and then the towing vehicle 10 and the load adjusting vehicle 30 can be brought to a rest. The winch assembly 12 is operated to wind the cable 16 around the drum 14 which power winches the entire fifth wheel assembly 56 including the front end of the trailer 110 and in fact the entire trailer 110 on its rear dual wheels (not shown). Assuming that the chassis 33 of the load adjusting vehicle 30 is approximately five feet long, this would advance the entire trailer 110 approximately five feet and at the same time will pull the rear wheels of the trailer from any difficult terrain. If this is not sufficient, the same operation may be repeated, that is, allowing the fifth wheel assembly 56 and the trailer 110 to drop back to the rear end of the load adjusting vehicle 30 and then power winching it forward approximately five feet each time. The operator of the vehicle 10 can judge the condition of the terrain and the reaction of the trailer 110 and start the towing vehicle 10 underway anytime it would appear that the trailer 110 will move. The power winch assembly 12 can be locked in position at any point.

Referring to FIG. 5 for another illustration, assuming that a muddy or swampy or difficult area represented by reference numeral 124 has been encountered, and that it is necessary in order to move across this area in a reasonable length of time to get the towing vehicle 10 with its rear tires 22 completely out of this terrain, the towing vehicle 10 can be driven to the position shown in FIG. 5 at the far lefthand side of the sheet by slacking cable 16 as much as necessary. Then the power winch assembly 12 can be operated to wind the cable 16 around the drum 14 which power winches the entire load adjusting vehicle 30 and the trailer 110 seated thereon across the difficult area 124 until the trailer 110 and the load adjusting vehicle 30 therebeneath reaches the dotted line position shown in FIG. 5 at which time the wheels of both the towing vehicle 10 and the wheels 50 of the load adjusting vehicle 30 as well as the rear wheels of the trailer 110 are sufficiently clear of the difficult area 124. Should any further difficulty be encountered, as mentioned previously in connection with FIGS. 3 and 4, the fifth wheel assembly 56 can be permitted by slacking cable 16 to slide to the rear of the load adjusting vehicle 30 and then the trailer 110 can be power winched forward until proper traction is reached and travel is sufficiently normal. Not only does this operation speed the removal of timber, pulpwood as well as other items over difficult terrain but it also creates a safer condition and tends to eliminate or at least discourage dangerous conditions where an operator of a vehicle such as 10 attempts to use the complete capacity and power of the vehicle in an effort to move a heavily loaded trailer 110 out of a ditch or other difficult terrain. This same arrangement in the load adjusting vehicle 30 could be used with military vehicles such as crawler vehicles, for example a tank, pulling a heavily loaded trailer load of ammunition or other supplies in a difficult area.

By securing a conventional snatch block (pulley) assembly 150 to a tree or other fixed object 152 the cable 16 can be turned in any direction and can be made perpendicular to the longitudinal axis of the trailer thereby placing the loaded trailer 110 perpendicular to the towing vehicle 10 and moving the trailer 110 perpendicular to the line of travel of the towing vehicle 10. This would be useful in any situation where a straight line pull like that shown in FIG. 5 cannot be effected as, for example, where there is a drop-off, a hill, a ditch, or where one prefers to make use of an existing cleared road or area.

While I have shown and described a particular embodiment of this invention which is a preferred embodiment described mainly in connection with a logging operation, this is by way of illustration only and does not constitute by any means the only form of this invention since various alterations, changes, deviations, additions, omissions, combinations, separations, departures and variations may be made in the embodiment shown and described and in the function and use thereof without departing from the scope of my invention as defined by interpretation of the following claims.

What I claim is:

1. In a load adjusting vehicle to be interposed between a towing vehicle such as a skidder or crawler tractor and a towed vehicle such as a trailer with rear wheels at one end thereof:
   (a) a power source on the towing vehicle; the load adjusting vehicle having a vehicle frame with a front and a rear end and ground supporting wheels on each end thereof,
   (b) a movable trailer support on said load adjusting vehicle frame,
   (c) and means for operating said movable trailer support from the power source on the towing vehicle comprising extensible and retractible power transfer means connected between the towing vehicle power source and the load adjusting vehicle to pull and operate said trailer support from the rear end of the frame to the forward end of the frame of said load adjusting vehicle said trailer support being extensible and retractible from said power source so that said towing vehicle can move said trailer support relative to the load adjusting vehicle frame, said trailer thereby being powered relative to said load adjusting vehicle frame to move said trailer without necessarily moving said towing vehicle or load adjusting vehicle and said towing vehicle and load adjusting vehicle being movable by moving said load adjusting vehicle frame relative to said trailer, whereby heavy trailer loads may be moved in this manner from difficult terrain.

2. The device in claim 1, wherein said load adjusting vehicle includes a trailer support member movably mounted for longitudinal, sliding motion on said vehicle and said extensible and retractible power transfer means attached to said trailer support.

3. The device in claim 2, wherein: said extensible and retractible power transfer means is a cable and there is a pulley on said trailer support member about which said cable moves as one end of said cable is wound at said towing vehicle, the other end being fixed to said towing vehicle.

4. The device in claim 2, wherein said trailer support member includes a means for receiving and retaining the front end of a trailer in movable relationship to be pulled and guided therebehind, and a hitch means on the front of said load adjusting vehicle for removable attachment to the towing vehicle and detachment therefrom.

5. The device in claim 2, wherein: said towing vehicle has a power operated cable winch thereon and a cable extending between said loading adjusting vehicle and said towing vehicle, said cable being operable on said trailer support member to move same by power from the rear of said load adjusting vehicle to the front.

6. The device in claim 2, wherein said trailer support member includes a means for receiving and retaining the front end of a trailer in movable relationship to be pulled therebehind, a detachable hitch means between said towing vehicle and said loading adjusting vehicle selectively operable to attach and detach same, a power operated cable winding means on said towing vehicle and a cable wound thereon, said cable being movably engaged with said trailer support for power operating same on said load adjusting vehicle.

7. The device in claim 6, wherein said trailer support member includes a conventional trailer fifth wheel plate notched to receive a trailer member therein, said plate being slidably mounted on said vehicle frame.

8. The device in claim 7, wherein said fifth wheel plate has a pulley attached thereto, said cable pasing around said pulley and having one end secured to said towing vehicle.

9. The device in claim 8, wherein said frame has longitudinal track means on opposite sides thereof and said fifth wheel is mounted on said tracks.

10. The device in claim 9, wherein there is anti-friction means between said track and said fifth wheel plate.

References Cited

UNITED STATES PATENTS

| | | | |
|---|---|---|---|
| 1,887,118 | 11/1932 | Collinge | 280—407 |
| 1,892,004 | 12/1932 | Reid. | |
| 2,306,231 | 12/1942 | Smith et al. | 280—408 |
| 2,697,614 | 12/1954 | Smith | 280—423 |
| 2,776,846 | 1/1957 | Willock | 280—407 |
| 2,832,610 | 4/1958 | Le Tarte. | |
| 3,413,015 | 11/1968 | Fontaine. | |

FOREIGN PATENTS

| | | |
|---|---|---|
| 189,284 | 5/1937 | Switzerland. |
| 249,273 | 3/1948 | Switzerland. |

LEO FRIAGLIA, Primary Examiner

U.S. Cl. X.R.

180—8; 280—404, 423, 479, 480; 254—166